United States Patent [19]

Person et al.

[11] 4,221,504

[45] Sep. 9, 1980

[54] STABILIZATION OF SUBSEA RISER PIPES HAVING FREE LOWER ENDS

[75] Inventors: Abraham Person, Los Alamitos; Sherman B. Wetmore, Westminster, both of Calif.

[73] Assignee: Global Marine, Inc., Los Angeles, Calif.

[21] Appl. No.: 886,907

[22] Filed: Mar. 15, 1978

[51] Int. Cl.² .............................................. E02B 1/00
[52] U.S. Cl. ..................................... 405/303; 9/8 R; 114/264; 405/195
[58] Field of Search ............... 61/1 R, 1 F, 86; 9/8 R; 114/264, 311; 138/108, 113, 114

[56] References Cited

U.S. PATENT DOCUMENTS

| | | | |
|---|---|---|---|
| 1,318,650 | 10/1919 | Dutka | 9/8 R |
| 1,840,324 | 1/1932 | Lindquist | 114/264 |
| 3,390,408 | 7/1968 | Lockwood et al. | 9/8 R |
| 3,435,793 | 4/1969 | Shurtleff | 61/1 R X |
| 3,460,501 | 8/1969 | Silverman | 114/264 X |
| 3,487,485 | 1/1970 | Holm et al. | 9/8 R |
| 3,488,783 | 1/1970 | Lockwood | 9/8 R |
| 3,576,108 | 4/1971 | Rowland | 61/1 F |
| 3,800,271 | 3/1974 | Stillman | 9/8 R X |
| 4,008,155 | 2/1977 | Castell | 61/1 F X |
| 4,116,009 | 9/1978 | Daubin | 114/264 |

FOREIGN PATENT DOCUMENTS 762731 4/1934 France .
1003977 3/1952 France .

Primary Examiner—David H. Corbin
Attorney, Agent, or Firm—Christie, Parker & Hale

[57] ABSTRACT

Apparatus for position stabilizing the lower end of an elongate duct, which is vertically disposable in an ocean and which is supported at its upper end, is described. The apparatus includes an elongate flexible tensile member which is disposable along the interior of the duct. The tensile member is adapted to be connected at one end thereof to a duct support structure and to extend through the duct. A weight of selected mass and size is connectible to the other end of the tensile member below the lower end of the duct. Means are connectible between the tensile member and the duct, at least adjacent the lower end of the duct, for establishing and maintaining a selected position of the tensile member relative to the duct.

11 Claims, 4 Drawing Figures

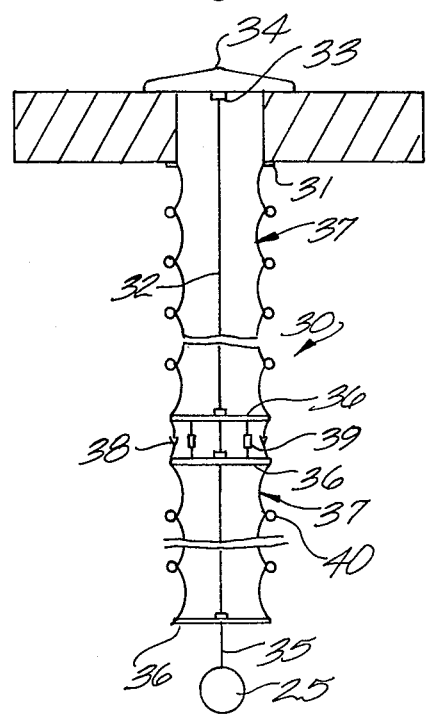
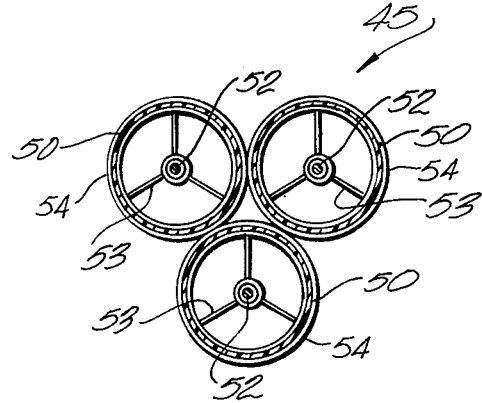

STABILIZATION OF SUBSEA RISER PIPES HAVING FREE LOWER ENDS

FIELD OF THE INVENTION

This invention pertains to fluid flow riser pipes and the like having free lower ends for use in ocean engineering and the like. More particularly, it pertains to the position stabilization of the free lower ends of such pipes and ducts.

BACKGROUND OF THE INVENTION

REVIEW OF THE PRIOR ART

Many ingenious and sophisticated proposals have been made in the field of ocean engineering calling for the use of large diameter vertical ducts of great length. These ducts extend from at or near the ocean surface to lower ends unconnected to the ocean floor. These proposals include concepts for ocean thermal energy conversion and for mariculture. The ducts involved in these proposals are sometimes referred to as riser pipes.

The concepts for ocean thermal energy conversion propose to use the difference in thermal energy levels between warm surface water and colder deepwater to generate electricity, for example. The available energy level difference is low and so these proposals rely on the use of very large quantities of warm and cold water. These proposals call for the necessary large volumes of deep cold water to be brought to the water surface through very large vertical ducts of great length. The mariculture proposals typically call for large quantities of cold nutrient-rich deep water to be brought to the warmer surface portions of the ocean to provide food for the growth of ocean plants and animals. For example, one proposal calls for kelp to be grown on frames located about sixty feet or so below the ocean surface and to be nourished by nutrient-rich water brought up to the vicinity of the frames from 1500 feet or more below the ocean surface.

These proposals and others similar to them have the common feature of requiring the use of very long relatively large diameter vertical ducts through which water from deep in the ocean may flow upwardly, i.e., upwell. The lower ends of these ducts may be located a substantial distance above the ocean floor and may be free, i.e., not anchored or otherwise held in fixed position by a connection to the ocean floor.

Any structure which extends vertically for any significant distance in the ocean will encounter at least one ocean current. Currents imposed drag forces upon such structures. The larger the structure, the greater its profile (effective area) presented to the current, and therefore the greater the drag forces which a given current will impose upon the structure. The drag forces applied to upwelling ducts produce deflection of the ducts. If the lower end of the duct is free, such deflections result in movement of the lower end of the duct away from its desired position. Often the duct will oscillate or whip about in the ocean in reaction to the current drag forces applied to the duct. Such motions of the duct may lead to damage of the duct or will reduce its useful life.

The problem of deflection of a long vertically disposed duct by ocean currents could be dealt with by stiffening the duct. Stiffening may be accomplished by making the duct of a rigid material, such as a metal. This solution, however, has two drawbacks, namely, the duct becomes heavy and requires larger and larger support structures, and the stresses introduced in the duct by bending moments generated by current drag forces may reach critical levels. The problem of high stress levels can be handled by making the duct walls thicker, but this in turn adds to the overall weight of the duct. Alternatively, the difficulty presented by critical stress levels may be resolved by making the duct flexible. A flexible duct, however, will deflect significantly. A duct 2000 feet long for collecting water at 2000-foot depths may be so significantly deflected by ocean currents as to have its lower end located only about a thousand feet below the water surface.

It is therefore seen that the need exists for techniques and arrangements for stabilizing the position of the free lower end of a suspended elongate duct in an ocean.

SUMMARY OF THE INVENTION

This invention addresses the need identified above. It provides simple, effective and economic techniques and arrangements for stabilizing the position of a free lower end of a suspended ocean engineering upwelling duct and the like.

Generally speaking, in terms of structure, the invention provides apparatus for stabilizing the position of the lower end of an elongate duct which is vertically disposable in an ocean and the like, and which is supported at its upper end. The apparatus includes an elongate tensile member which is disposable along the interior of the duct. The tensile member is connectible at one end to a duct support structure and is of sufficient length to extend in a duct through the lower end of the duct. A weight of selected mass and size is connectible to the other end of the tensile member below the lower end of the duct. The apparatus also includes means connectible between the tensile member and the duct, at least adjacent the lower end of the duct, for establishing and maintaining a selected position of the tensile member relative to the duct.

Several advantages are provided by this structure. The stabilizing weight is carried by the tensile member, not by the duct itself. The duct, therefore, can be made lighter than if it were required to support the stabilizing weight. If desired, the duct can be flexible to prevent the development of bending stresses therein in response to ocean current drag forces applied to the duct. The duct can be made of any buoyancy desired, either positive, negative, or neutral, independently of any constraints imposed upon the duct by the stabilizing weight. A principal advantage is that the stabilizing weight and its support, and the duct can be designed substantially independently of each other in terms of the different consideration pertinent to them.

DESCRIPTION OF THE DRAWINGS

The above-mentioned and other features of this invention are more fully set forth in the following detailed description of certain embodiments of the invention, which description is presented with reference to the accompanying drawings wherein:

FIG. 2 is a simplified fragmentary cross-sectional elevation view of another duct having its lower end position stabilized according to this invention;

FIG. 4 is a cross-section view taken along line 4—4 in FIG. 3.

DESCRIPTION OF THE ILLUSTRATED EMBODIMENTS

Figure 1:
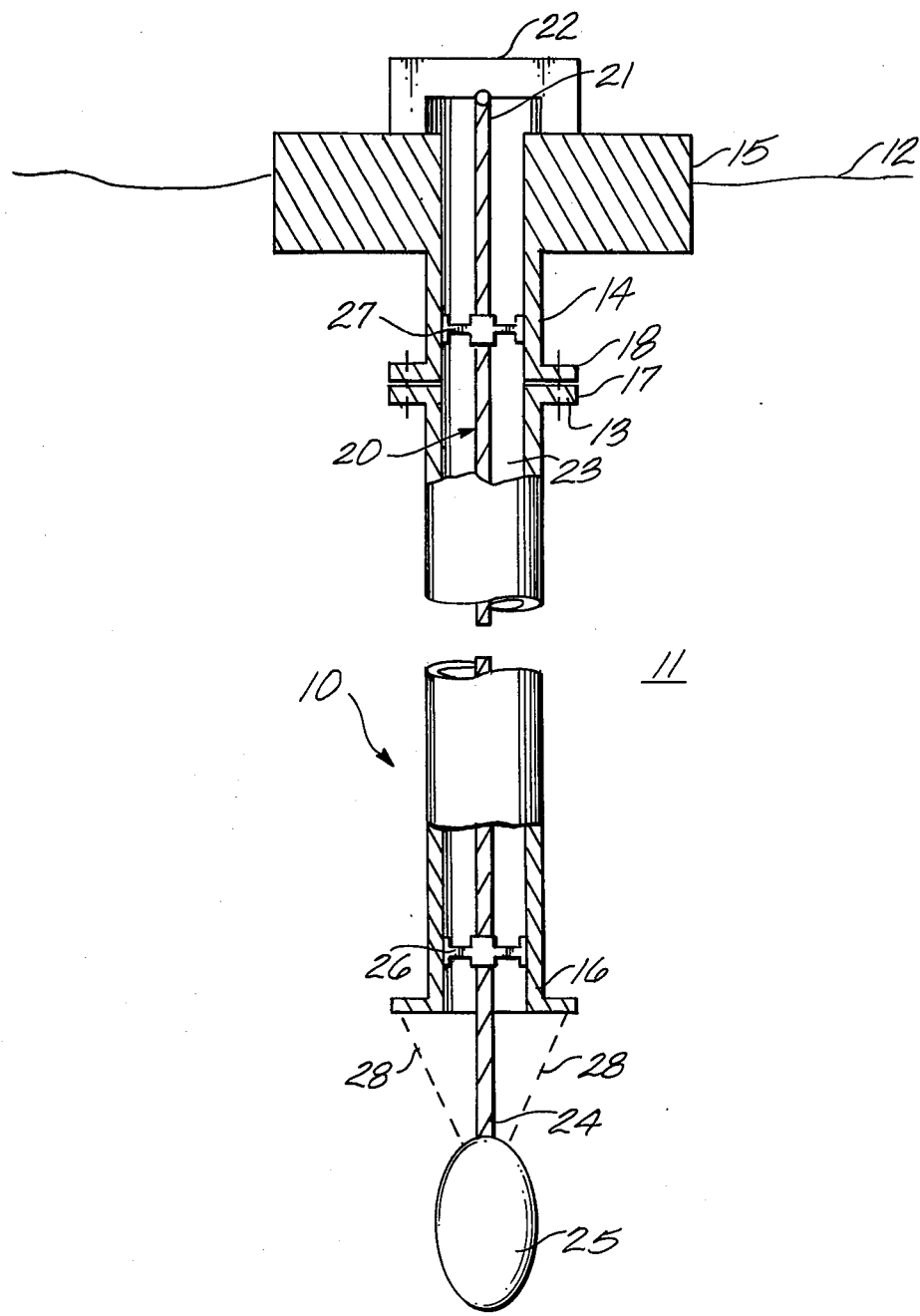
FIG. 1 is a simplified fragmentary elevation view, partially in cross-section, of a deep ocean upwelling duct stabilized according to this invention.

FIG. 1 is a fragmentary simplified view, partially in cross-section, of the installation of an elongate large diameter upwelling duct 10 which is disposed vertically in an ocean 11 having a surface 12. The duct has an upper end 13 connected by a suitable coupling 14 to a floating support structure 15. The support structure may be a ship or a buoyant platform on which is located suitable equipment for ocean thermal energy conversion, for example. Coupling 14 is hollow to provide communication through it to the support structure from the interior of duct 10.

While the same is not shown, it will be understood that the overall installation includes a suitable mechanism for inducing upward flow of water from the open lower end 16 of the duct through the duct either to the support structure or to adjacent the support structure. Such structure is not shown in the accompanying drawings since the flow inducing mechanism is not a part of this invention. The flow inducing mechanism could be a bladed impeller for a pump or the like located in or close to the duct support, or an air-lift mechanism, for example.

Duct 10 may be on the order of several hundreds or thousands of feet long and have a diameter of two feet or greater up to, but not necessarily limited to, fifty feet in diameter.

Coupling 14 provides a mechanism by which the duct is suspended from the support structure via the upper end of the duct. The nature of the coupling is not important to this invention. While the coupling 14 shown in FIG. 1 is a rigid coupling, the coupling can be axially free in the form of a slip joint, or flexible in the form of a bellows, universal joint or the like. The coupling can permit axial, angular or both axial and angular motion of the upper end of the duct relative to the support structure, as desired.

The connection of duct upper end 13 to coupling 14 is shown in FIG. 1 to be accomplished by complementary flanges 17 and 18 at the upper end of the duct and at the coupling, respectively. The nature of the connection between the support structure and the duct is not important to the practice of this invention. Accordingly, the mode of attachment of the duct to its support can either be by the complementary flange arrangement shown, or by other suitable couplings or clamps as desired.

As shown in FIG. 1, duct 10 is an essentially continuous structure of constant diameter along its length. It will be understood, however, that the duct, in practice, is defined by a plurality of duct sections suitably connected together by appropriate couplings; the couplings may be threaded couplings of the type encountered in the joints between adjacent lengths of drill pipe as encountered in the oil and gas drilling industry. The duct may be made of any material desired, including metal, fiberglass, or synthetic plastic resin, such as polyethylene, as desired.

The important aspect of duct 10 is that it is of sufficient length and diameter that, over the extended length of the duct, it manifests substantial flexibility and susceptibility to lateral deflection or bending. It is sufficiently long that, when installed in the manner represented in FIG. 1, the duct passes vertically through a sufficient depth of the ocean that it is exposed to and subjected to the action of at least one ocean current. As the current moves past the duct, it imposes drag forces on the duct. The drag forces tend to deflect the duct laterally so that, proceeding downwardly along the duct, its actual position tends to be displaced progressively laterally from the intended vertical line of the duct. This tendency, unless counteracted, would result in the open lower end of the duct being disposed in use at a depth and position different from its intended position. The forces applied by the ocean currents to the duct may not be stable with time. As a result, because of its extensive length and the flexibility of the duct due to such extensive length, the duct may tend to oscillate or whip about; such motions of the duct can lead to failure of the duct or, as a minimum, a reduction of its useful life.

To stabilize the position of the lower end 16 of duct 10 on, or close to, a line vertically through support structure 15, an elongate tensile member 20 is disposed within the duct. The tensile member extends along the entire length of the duct as shown in FIG. 1. The tensile member has an upper end 21 connected to the support structure, as by way of a strongback 22 mounted to the support structure to span an upward extension to the support structure of a fluid flow passage 23 defined within the duct and coupling 14. The tensile member has a lower end 24 which, upon completion of the installation of the duct in ocean 11, is disposed a selected distance below the open lower end of the duct. A weight 25 of selected mass and size is connected to the lower end of the tensile member.

A centralizing spider 26 is carried by the duct adjacent its lower end to establish a predetermined relationship between the tensile member and the duct at the location of the spider. As shown in FIG. 1, this relationship is one of concentricity of the duct to the tensile member. The spider is fixed to the duct but not to the tensile member, thereby to allow the tensile member to move axially through the spider. Accordingly, the entire immersed weight of weight 25 is carried by tensile member 20. If desired, additional centralizing spiders may be associated with the tensile member at other locations along the length of the tensile member; this is represented by spider 27 positioned in coupling 14 and, if desired, further centralizing spiders may be carried by the duct at desired locations along the length of the duct.

A length of wire rope is a preferred tensile member in the practice of this invention. In any event, the outer diameter of the tensile member is substantially less than the inner diameter of duct 10 so that the presence of the tensile member in the duct occupies a very small portion of the transverse cross-sectional area of fluid flow passage 23. Spiders 26 and 27 are essentially open structural frameworks (see FIG. 4) which also present minimum occlusion of flow area of passage 23.

Because the tensile member is axially slidable through the central positions of spiders 26 and 27, the entire load presented by weight 25 is carried by the tensile member, rather than by duct 10. The duct can be designed and constructed without regard to the presence of weight 25 and tensile member 20 which provide for the stabilization of the position of the lower end of the duct. That is, the duct can be defined with respect to the bending moments imposed upon it by ocean current forces, with respect to the pressure differentials which exist in use between the inside and outside of the duct, and with respect to considerations occasioned by the nature of the material from which the duct is defined. However, if the nature of the duct itself is such that it can tolerate additional loads applied to it at its lower end, the effective load of weight 25 can be shared between the duct and the tensile member by the use of optional attachment cables 28 connected between the lower end of the duct and the weight; such optional attachment cables are represented in broken lines in FIG. 1.

Where supplemental weight support cables are connected between weight 25 and the lower end of the duct, the arrangement preferably is such that the major portion of the effective weight of the stabilizing weight 25 is carried by tensile member 20.

Weight 25 is defined to have sufficient mass and inertia that the combination of the mass and the tensile member function in a manner analogous to that of a plumb bob, despite the presence of the duct around the tensile member over substantially the entirety of the length of the tensile member, and despite the presence of current drag forces which may be applied laterally to the duct.

In one proposed application of this invention, duct 10 has a length of 1500 feet and is defined of 24 inch diameter polyethylene pipe.

FIG. 2 shows another duct 30 which is pendulously suspended at its upper end 31 from a floating support 15. A wire rope tensile member 32 extends from an upper end connected, as at 33, to a supporting strongback 34 mounted to the support structure. Member 32 has a lower end 35 disposed below the lower end of the duct and to which is connected a suitable stabilizing weight 25. A suitable essentially open centralizing spider 36 is carried by the lower end of the duct and cooperates with the tensile member. Duct 30 is a flexible duct composed of a plurality of sections 37 of selected diameter and length having a spider 36 connected to it at each end thereof. The adjacent ends of each duct section are interconnected in such a manner as to define a watertight seal 38. Each duct section 37 is defined as a tube of water impervious fabric; each duct section is collapsible axially and is flexible. The support spiders above and below each connection between adjacent duct sections are interconnected by suitable couplings 39. Each duct section includes a plurality of stiffening hoops 40 secured to it at appropriate locations along its length.

If the duct with which a tensile member and stabilizing weight according to this invention is used is a flexible duct in the nature of duct 30, then the cooperation between spiders 36 and the tensile member preferably is one which enables the tensile member to carry the weight of the several duct sections in addition to the weight of stabilizing weight 25. Tensile member 32, therefore, serves the dual function of being both a support for stabilizing weight 25 and a tensile core along the interior of the duct for supporting the weight of the duct.

Flexible duct 30 is described in greater detail in commonly owned copending application, Ser. No. 886,904 filed concurrently with the filing of this application. Weight 25 functions in duct 30 in the same manner in which it functions in duct 10.

Figure 3:
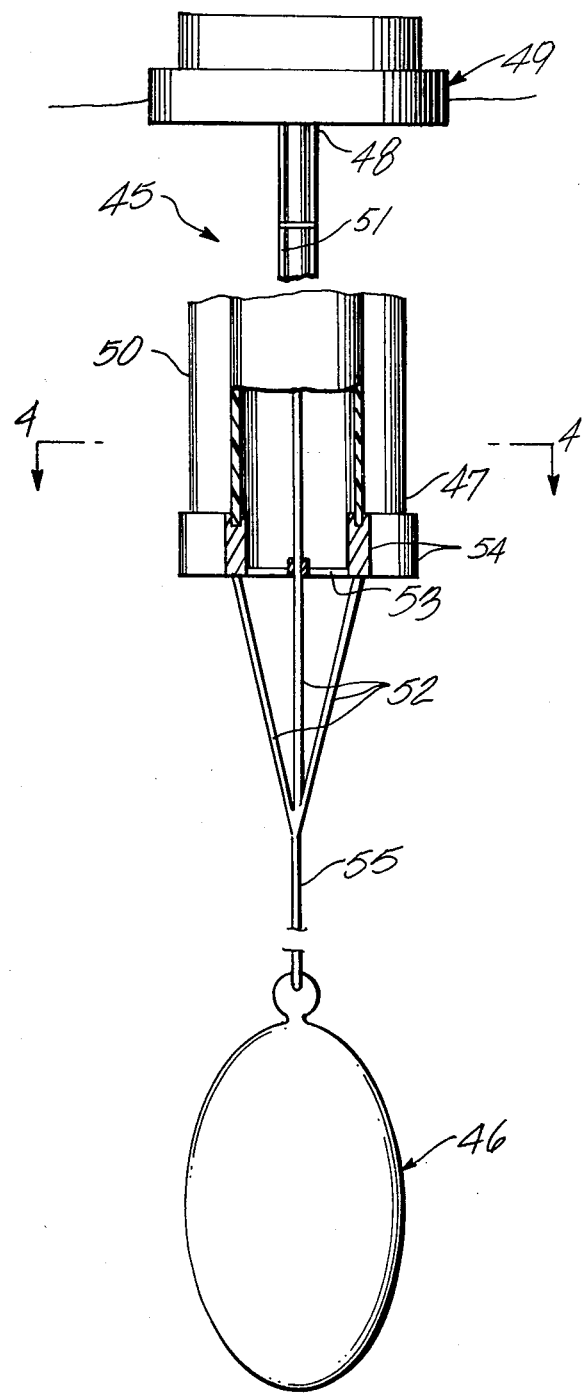
FIG. 3 is a fragmentary elevation view, partially in cross-section, of another duct and stabilizing arrangement according to this invention.

FIGS. 3 and 4 show another deep ocean upwelling duct 45 having a stabilizing weight 46 coupled to its lower end 47. The duct has an upper end 48 connected to a floating support structure 49, the duct being vertically disposed below the support structure. The support structure may be an ocean thermal energy conversion facility.

Duct 45 is defined by a plurality of essentially identical elongate pipes or tubular structures 50 which are nested and bundled together by suitable means, such as strap bindings 51. In duct 45, there are three pipes 50; a corresponding plurality of elongate flexible tensile members 52 (preferably wire rope cables) are used to support weight 46. Each tensile member 52 is disposed in a corresponding pipe and extends from a connection at its upper end to the support structure, along the length of the pipe, through the open lower end of the pipe, and then a desired distance below the pipe to its connection to the stabilizing weight. An openframework spider 53 is carried by the lower end of each pipe for centralizing the corresponding tensile member coaxially of the pipe at the location of the spider. Each tensile member is axially movable through its spider.

A proposed application of duct 45 is as a component of an ocean thermal energy conversion facility. In this proposal, each of pipes 50 is 2100 feet long and has a diameter of 48 inches. Each pipe is made of polyethylene and has a wall thickness of 1.8 inches. Tensile members 52 are defined by lengths of 1-inch wire rope brought together below the duct into a 2-inch wire rope 55. Stabilizing weight 46 has a dry weight of about 80,000 lbs., an immersed weight of 75,000 lbs., and is made of concrete. Weight 46 is disposed 200 feet below the lower end of the duct. Polyethylene has a specific gravity less than 1.000. Therefore, in this embodiment of the duct as shown in FIG. 3, the duct tends to be positively buoyant. To counteract this positive buoyancy, a ballast ring 54 is carried by each pipe 50 at its lower end, preferably as a part of each spider 53. Each ballast ring and spider unit has sufficient negative buoyancy that the combination of the pipe and ballast ring/spider unit is slightly negative buoyant; this negative buoyancy is defined wholly independently of the presence of weight 46 and its supporting tensile members since the tensile members only slidably engage the several spiders. The entire immersed weight of stabilizing weight 46 is carried by tensile members 52. The immersed weight of the ballast rings is on the order of 55,000 lbs.; the ballast rings also have a position stabilizing effect on the lower end of the duct. The total effective stabilizing weight (immersed) in the system is on the order of 130,000 lbs.

The effective immersed weight of ballast rings 54 imparts only slight negative buoyancy to the duct so as to minimize the static axial loads upon the duct in use. The duct, therefore, can be designed essentially entirely in terms of the environmental and dynamic loads to which it will be subjected in use.

Wire rope cable is preferred for the tensile members in the practice of this invention. Such tensile members are flexible and do not develop significant bending stresses.

The proposed arrangement described above with reference to FIG. 3 is the presently preferred embodiment of this invention. That embodiment preferably is constructed on a beach or the like and then towed into position where it is righted (i.e., disposed in its intended vertical position) and connected to its support structure.

Persons skilled in the art to which this invention pertains will appreciate that the preceding description has been presented with reference to presently preferred embodiments of the invention as illustrated in the accompanying drawings. It will be understood, however, that the present invention can be manifested in embodiments different from the described embodiments. The preceding description sets forth the presently best known modes of practicing this invention, but certainly not all possible modes. Accordingly, workers skilled in the art will readily appreciate that modifications, alterations or variations in the arrangements and procedures described above may be practiced without departing from, and while still relying upon, the essential aspects of this invention.

What is claimed is:

1. In an installation of an elongate, vertically disposed, flexible duct in an ocean and the like, the duct being adapted to be connected at its upper end to a duct support located above the duct upper end for carriage by the support duct of the immersed weight of the duct, the duct when connected to the support extending downwardly from the duct support to a lower end having no connection to the ocean floor and providing a path for flow of water through the duct from an open lower end thereof to the support, the improvement comprising apparatus for stabilizing the lateral position of the lower end of the duct relative to the duct support and comprising an elongate flexible tensile means disposed along the interior of the duct, the tensile means being connected at one end thereof to the duct structure, a weight of selected mass and size, the weight being connectable to the other end of the tensile means a selected distance below the lower end of the duct for support of the weight above the ocean floor by the tensile means, and positioning means connected between the tensile means and the duct at least adjacent the lower end of the duct for establishing and maintaining a selected position of the tensile means laterally relative to the duct.

2. Apparatus according to claim 1 wherein the tensile member is comprised of wire rope cable.

3. Apparatus according to claim 1 including weight support means connectible between the weight and the lower end of the duct for carrying a portion of the immersed weight of the weight by the duct.

4. Apparatus according to claim 1 wherein the positioning means is an open structure arranged for the flow of liquid therethrough.

5. Apparatus according to claim 1 wherein the tensile member is axially slidable relative to the positioning means.

6. Apparatus according to claim 1 wherein the positioning means is cooperable with the tensile member for restricting movement of the tensile member therepast in at least one of two axial directions of movement of the tensile member relative to the duct.

7. Apparatus according to claim 1 wherein the tensile member is arranged to carry the entire immersed weight of the weight in use.

8. Apparatus according to claim 1 wherein the tensile means comprises plural elongate flexible tensile members disposable in the duct and joined together into a further single tensile member between the lower end of the duct and the weight.

9. Apparatus according to claim 1 wherein the duct is comprised of polyethylene pipe having net positive buoyancy, and ballast means connected to the lower end of the pipe for counteracting the positive buoyancy of the pipe.

10. Apparatus according to claim 1 wherein the duct comprises a plurality of substantially parallel tubular constructions having substantially equal length, open upper and lower ends, and which are disposed substantially in a bundle, wherein the tensile means comprises a tensile member disposed along the interior of each tubular construction, the plurality of tensile members collectively supporting the weight.

11. A method for stabilizing the lateral position of the lower end of an elongate flexible duct having opposite open ends and adapted for flow of water through the duct when vertically disposed in an ocean and the like and supported at its upper end by a support structure located above the duct upper end, the method comprising the steps of disposing an elongate flexible tensile member through the interior of the duct and beyond the lower end of the duct, connecting the tensile member at the upper end thereof to the duct support structure, connecting a weight of selected mass and size to the other end of the tensile member at a distance below the duct which is less than the distance between the lower end of the duct and the ocean floor, coupling between the tensile member and the duct at least adjacent the lower end of the duct means for establishing and maintaining a selected position of the tensile member laterally relative to the duct, and supporting essentially the entire immersed weight of the weight by means of the tensile member.

* * * * *